United States Patent [19]

Clauss et al.

[11] 4,195,536
[45] Apr. 1, 1980

[54] PLANETARY TRANSMISSION

[75] Inventors: Julius A. Clauss, Birmingham; John S. Ivey, Bloomfield Hills, both of Mich.; Richard L. Smirl, Arlington Heights, Ill.

[73] Assignee: Borg-Warner Corporation, Chicago, Ill.

[21] Appl. No.: 748,572

[22] Filed: Dec. 8, 1976

[51] Int. Cl.² .................. F16H 57/10; F16H 37/08
[52] U.S. Cl. ..................................... 74/759; 74/695
[58] Field of Search ............... 74/759, 753, 695, 762, 74/763

[56] References Cited

U.S. PATENT DOCUMENTS

| 2,395,459 | 2/1946 | Carnagua | 74/759 |
|---|---|---|---|
| 2,593,568 | 4/1952 | Kelbel | 74/759 |
| 2,821,867 | 2/1958 | Kelbel | 74/759 X |
| 3,473,415 | 10/1969 | Kepner | 74/759 |
| 3,541,886 | 11/1970 | Bookout | 74/763 |
| 3,614,902 | 10/1971 | Candellerd | 74/763 X |
| 3,800,626 | 4/1974 | Koivunen | 74/695 |
| 3,802,294 | 4/1974 | Smirl | 74/759 |
| 3,853,023 | 12/1974 | Mori et al. | 74/759 |
| 3,859,872 | 1/1975 | Clauss, Jr. | 74/763 |
| 3,977,272 | 8/1976 | Neumann | 74/759 |
| 3,986,413 | 10/1976 | Stockton | 74/695 X |

Primary Examiner—Lance W. Chandler
Attorney, Agent, or Firm—Robert L. Zieg

[57] ABSTRACT

A planetary transmission mechanism comprising two simple planetary gear sets driven by the engine of a vehicle by an input clutch or torque converter and having four friction engaging devices and a one-way engaging device to establish four forward driving ratios and reverse through the transmission. A center output gear is mounted between the input clutch or torque converter and the planetary gear sets. The pair of friction engaging devices comprising clutches associated with the planetary gear set are mounted immediately adjacent the gear input elements which they connect.

2 Claims, 2 Drawing Figures

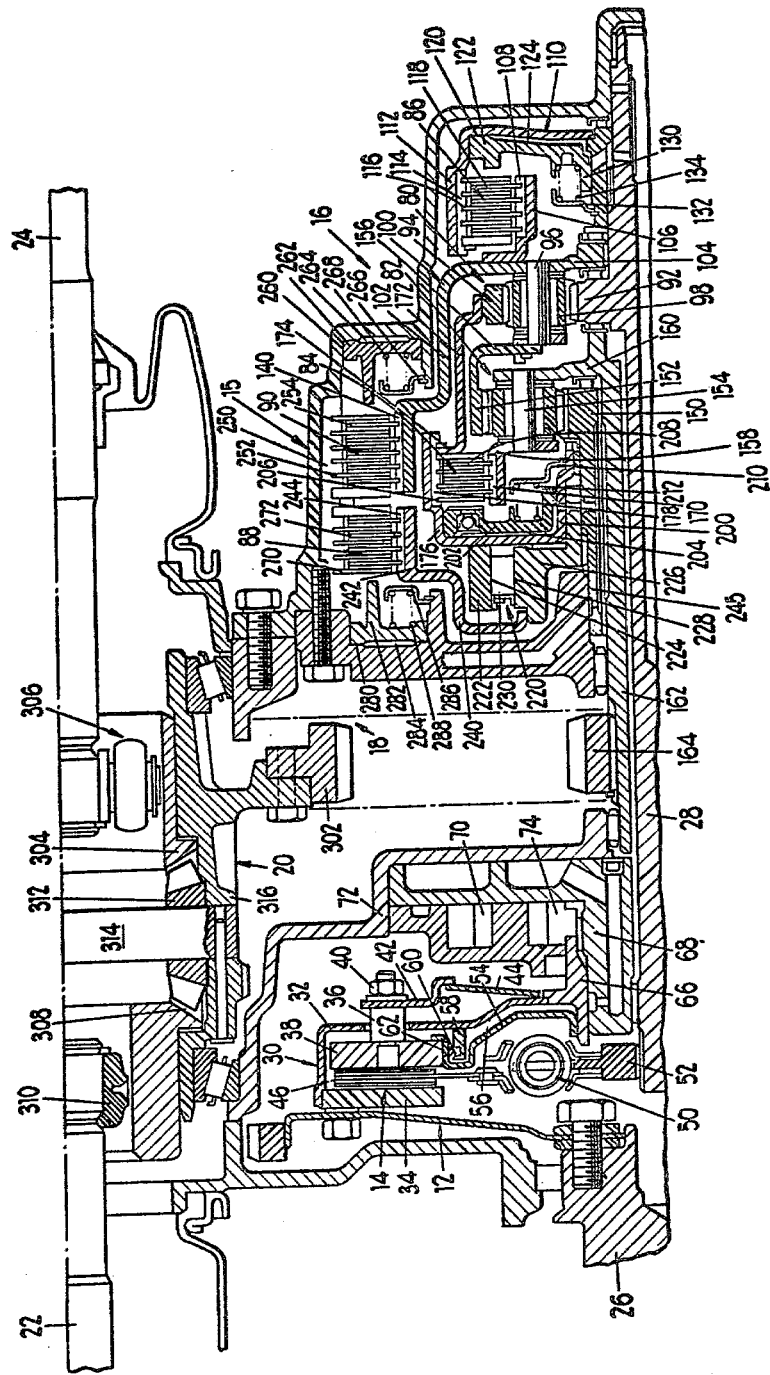

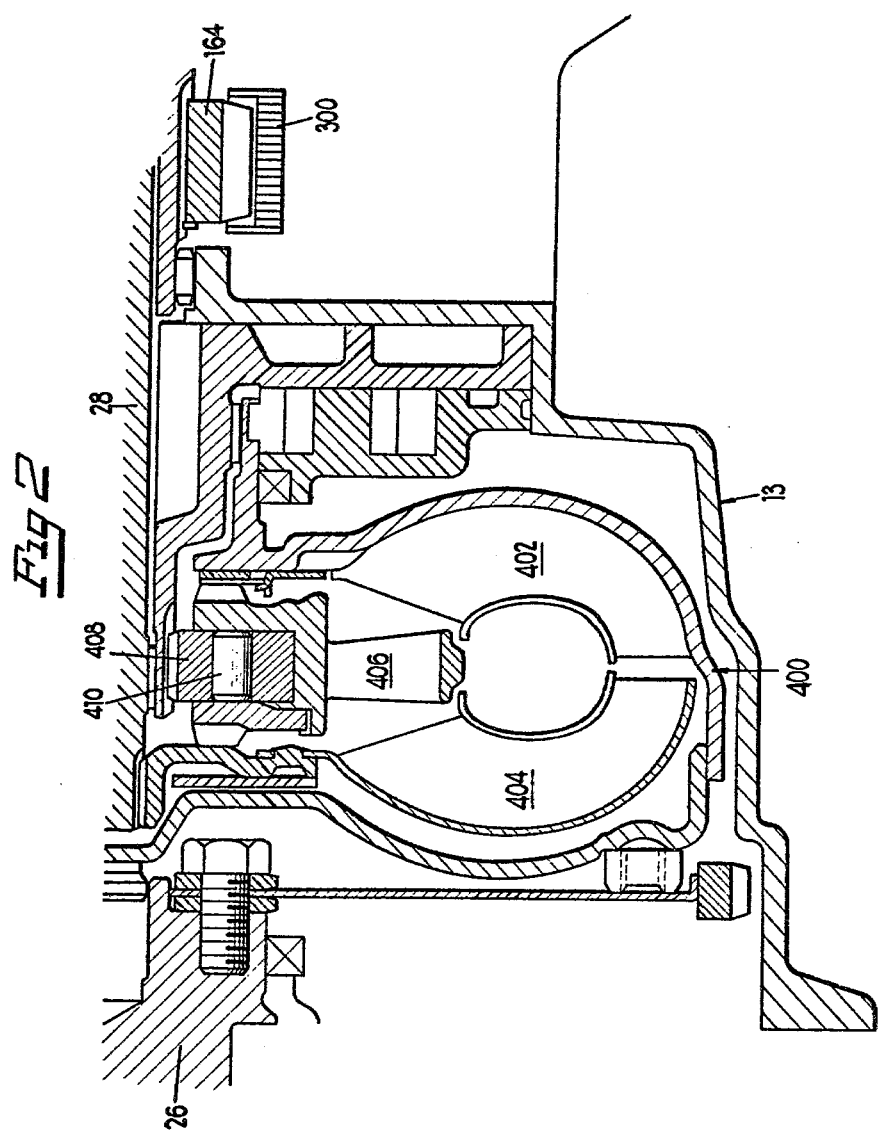

PLANETARY TRANSMISSION

BACKGROUND OF THE INVENTION

It has been known in the prior art to provide four forward driving ratios with a pair of simple planetary gear sets. In the prior art and specifically as shown in U.S. Pat. No. 3,986,413 a solution to providing four forward driving ratios from two simple planetary gear sets is provided. However, with this solution and certain others in the prior art, a split power path is used to the output. This creates complication and expense in that with a pair of input shafts and an output shaft, three concentric shafts are required for the transmission mechanism. In addition, prior solutions utilize brake mechanisms of different diameters, and drum type brakes rather than disc units. These prior solutions can result in transmissions which are difficult to manufacture and expensive in obtaining the four forward driving ratios. In addition, certain of the prior art devices even though providing four forward driving ratios from a pair of planetary gear sets involved a fourth or high speed ratio which is overdrive ratio resulting in high rotational speeds of certain elements of the gear sets which can cause early failure of the components and noise problems.

SUMMARY OF THE INVENTION

To obviate the above-mentioned difficulties the transmission disclosed herein provides a four forward speed transmission mechanism easily adapted for front or rear wheel drive mechanism where the transmission, engine and driving wheels are all at the same extremity of the vehicle. The present solution includes a single input clutch or in the alternative an input torque converter connected by a single intermediate input shaft to two simple planetary gear sets and the input clutch of torque converter. A pair or clutches for the planetary gear set are provided which are mounted immediately adjacent the gear set elements which they drivingly connect. The brake mechanisms for the planetary gear set comprising two disc brake mechanisms of identical diameters, mounted adjacent one another in a location of the casing which minimizes space requirements and maximizes the torque capacity of the brake mechanism.

In addition by having a single input to the pair of simple planetary gear sets from the input clutch or torque converter, and a single output shaft connecting the planetary gear sets and the output gearing, only two concentric shafts are required which results in economy of manufacture over those transmission devices having a split power path requiring a pair of concentric input shafts and a concentric output shaft for a center output, as is normally required in installations where the transmission, engine, and axle driving mechanisms are at the same end of the vehicle.

BRIEF DESCRIPTION OF THE DRAWINGS

FIG. 1 is a cross sectional view through a transmission and axle combination embodying the principles of the present invention; and FIG. 2 is a view showing a modified form of transmission mechanism wherein the input clutch is replaced by a hydraulic torque converter.

DETAILED DESCRIPTION OF THE INVENTION

Referring to FIG. 1, the improved transmission mechanism of the present invention is illustrated and generally comprises an input section 12 including a friction clutch 14 and a planetary gear section 16. Between planetary gear section 16 and input section 12 is an output section 18 which includes a differential mechanism 20, adapted to drive axle shafts 22 and 24 connected to the driving wheels of the vehicle. Input section 12 is mounted in a casing 13 and joined with casing 13, is a casing 15 in which is mounted planetary section 16.

Input section 12 as shown in FIG. 1, includes a friction clutch or input means 14 for connecting shaft 26 driven by the engine to an input shaft 28 which interconnects clutch 14 and planetary section 16. Clutch 14 includes a driving member 30 comprised of a sheet metal housing 32 and an annular reaction plate 34. Mounted within housing 32 is an apply member including an apply plate 38 which is connected by an annular return member 42 with a Belleville return spring 44. Apply plate 38 is engageable with a friction clutch disc 46 which has friction material on either side thereof, the disc thus being adapted to be forced by apply plate 38 against reaction plate 34 to clutch members 34 and 38 together for transferring drive from housing 30 driven by input shaft 26 through clutch disc 46 to input shaft 28.

Clutch disc 46 includes a damper spring assembly 50 on a diameter inward of the friction material on disc 46. Damper assembly 50 may be of a known construction such as for example, shown in U.S. Pat. No. 3,380,566 of common assignee. The damper assembly 50 serves to transfer drive to a central hub 52 which is splined to input shaft 28. Thus, when clutch 14 is engaged drive will be transferred from shaft 26 driven by the engine to input shaft 28.

Apply plate 38 is mounted on an annular piston member 54 which is axially moveable and apply plate 38 is thus moveable axially. Piston 54 defines a fluid chamber 56 which is adapted to receive fluid pressure through appropriate fluid pressure channels when clutch 14 is to be engaged. Housing 32 includes an inner cylindrical sealing member 58 which has an annular seal 60 affixed thereto adapted to have sealing engagement with an axially extending portion 62 on piston 54. Housing 32 is engaged by the inner diameter of Belleville spring 44. Thus, when pressure is received in chamber 56, piston 54 will move to the left against the force of Belleville spring 44 and move apply plate 38 into engagement with friction disc 46 and squeeze disc 46 against reaction plate 34 to engage the clutch. When fluid pressure is released from chamber 56 Belleville spring 44 will serve to return housing piston 54 and apply plate 38 to the right as viewed in FIG. 1 to release clutch 14.

As will be apparent, the central hub 66 of housing 32 is drivingly connected to a pump assembly 70 provided within an inner casing wall 72. Pump assembly 70 as illustrated is an internal-external gear type but may be of any known type of pump used in this environment. Housing 32 transfers drive from the engine to the pump 72 through hub 66, the hub 66 thus having a sliding driving engagement with an inner gear 74 of pump 70.

As has been described above, clutch 14 is engageable to provide drive to input shaft 28 to provide a driving input to planetary gear section 16. Planetary gear section 16 includes a pair of simple planetary gear sets 80 and 82. In connection with the planetary gear sets 80 and 82 are four friction engageable disc devices as follows; a clutch 84, a clutch 86, a brake 88 and a brake 90. In addition a one-way clutch 220 is provided for gear sets 80 and 82.

Planetary gear set 80 includes a sun gear 92 attached to input shaft 28, a ring gear 94, and a planetary carrier member 96. Mounted on carrier member 96 are a series of planetary pinions 98 which mesh with ring gear 94 and sun gear 92 in a known manner. Attached to and a part of planetary carrier 96 is a brake member 100 which is formed of sheet metal and which has an axially extending portion 102 and a radially extending portion 104. Secured to the radially extending portion 104 is a sheet metal clutch member 106 which has a series of splines 108 formed therein. Clutch member 106 may be secured to radial flange 104 by electron beam welding or other known joining techniques.

Provided on shaft 28 is an annular clutch member 110 which has an axial portion 112 located radially outwardly of clutch member 106. Axial portion 112 has a series of splines 114 formed on the inner diameter thereof similar to the construction of splines 108. A series of interleaved clutch plates are provided with an engageable to connect external clutch member 112 with internal clutch member 106. A first series of clutch plates 116 is connected to splines 114 on member 112 and interleaved therewith is a series of clutch plates 118 splined to clutch member 106. Within housing 110 is a clutch cylinder 120 which has a piston 122 slidable therein. Piston 122 together with clutch housing 110 defines fluid pressure chamber 124. Clutch housing 110 includes an internal axial hub member 130 which is splined to input shaft 28. Secured on hub 130 is a spring retainer 132. Springs 134 are provided serving to return piston 122 to the right when no fluid pressure exists in chamber 124 when clutch 86 is to be disengaged. Formed in axial portions 102 of brake member 100 is a series of external splines 140.

Planetary gear set 82 includes sun gear member 150, a ring gear member 152, and a planetary carrier member 154. Ring gear 152 is connected by an annular sheet metal drum 156 with planetary carrier 96 of planetary gear set 80. Planetary carrier 154 includes a sheet metal clutch hub 158 on the left side thereof as viewed in FIG. 1, and a radial flange 160 is integral with an axially extending output shaft 162 which has splined thereon an output sprocket gear 164. Hub 158 includes a series of external splines 170 formed in the sheet metal thereof.

Secured to ring gear 94 of gear set 80 is cylindrical sheet metal drum 172 which has a spline or notched outwardly extending portion 174, which is adapted to drivingly engage an annular sheet metal reaction member 176. Reaction member 176 includes a series of internal splines 178 formed in the sheet metal thereof, to which the portion 174 is splined and is thus adapted to transfer rotational torque between ring gear 94 and reaction member 176.

Clutch 84 is adapted to be engaged to connect hub 158 and reaction member 176, as will be explained. Reaction member 176 includes an annular sheet metal cylinder 200 which has a piston 202 therein. Piston member 202 and cylinder 200 define a pressure chamber 204 therebetween. A series of interleaved friction plates 65 extend between splines 170 on flange 158 and splines 178 on reaction member 176. A series of friction plates 206 is provided engaging splines 178 and interleaved therewith is a series of friction plates 208, engaging splines 170. When fluid pressure is received in chamber 204, piston 202 will move to the right to press plates 206 and 208 together to engage clutch 84 drivingly connect ring gear 94 and reaction member 176 with planetary carrier 154 through hub 158. Mounted within the internal diameter of the cylinder 200 is a retainer 210. Extending between retainer 210 and piston 202 is a series of coil springs 212 adapted to return piston 202 to the left as viewed in FIG. 1 when fluid pressure is released from chamber 204.

A one-way clutch mechanism 220 is provided which engages with reaction member 176 in a manner to be described. Brake reaction member 176 has an axial flange 222 which defines an inner race 224. A brake hub 226 is provided internal of one-way clutch 220 which defines an external race 228. Mounted between races 228 and 224 are a series of sprags 230 adapted to provide a driving engagement between flange 222 and hub 226 in one direction of rotation only, as is well known in the prior art. Connected to hub 226 is a brake flange 240 of sheet metal which has drum portion 242 having splines 244 thereon. Hub 226 is also splined to a hollow shaft 245 which has a sun gear 150 thereon. Shaft 245 is concentric with output shaft 162.

As described above, the transmission mechanism described herein includes a pair of friction brake units 88 and 90, which are now described. Formed in and internally of casing member 15 is a series of internal splines 250 which are adapted to receive, in the case of brake 90, for example, a series of brake discs 252 which are externally splined to engage with splines 250. Interleaved with brake discs 252 are brake discs 254 which engage splines 140 on brake member 100. Defined within casing member 15 is a brake cylinder 260 which has slidable therein a piston 262, which defines with cylinder 260 a fluid chamber 264. Also provided in cylinder 260 is a retainer 266. A series of coil springs 268 extend between retainer 266 and piston 262. When fluid pressure is received in chamber 264 piston 262 will move to the left as viewed in FIG. 1, to bring into engagement brake discs 252 and 254 to engage brake 90 and thus, fix brake member 100 to casing 15 and hold member 100, planetary carrier 96, and ring gear 152 stationary.

Brake 88 is comprised of a series of brake discs 270 externally splined to engage splines 250 in casing 15. Interleaved with brake discs 270 are a series of brake discs 272 which are splined internally to engage splines 244 on flange 240. Defined within casing 15 is a brake cylinder 280 having slidable therein a piston 282. Piston 282 and cylinder 280 define a fluid chamber 284. Mounted in an internal diameter of cylinder 280 is a retainer 286. Extending between retainer 286 and piston 282 are a series of coil return springs 288 which are adapted to return piston member 282 to the left as viewed in FIG. 1, when brake 88 is to be released. As will be apparent, when fluid pressure is received in chamber 284, piston 282 will move to the right to bring into engagement brake discs 270 and brake discs 272, to engage brake 88 and hold brake flange 240, brake hub 226, and sun gear 150 stationary.

Output section 18 of the present transmission includes sprocket gear 164 driven by output shaft 162. Engaged with sprocket gear 164 is a chain 300. Chain 300 is also engaged with a sprocket 302 which forms a driving sprocket for the differential assembly 20 and thereby is operable to transfer drive to the driving axles shafts 22 and 24. Differential mechanism 20 includes a beveled side gear member 304 connected through a universal joint assembly, 306 to drive shaft 24, and a beveled side gear 308 is connected through a universal joint assembly 310 to drive axle shaft 22. Interconnecting the side gears 308 and 304 are a plurality of planetary pinions 312 which are rotatably mounted on a planetary pinion carrier member 314 which is fixed within a driving casing 316 of differential 20. Ring gear 302 is bolted or secured to casing 316.

The unique transmission described above is functional to provide four forward driving ratios and reverse, having only four friction engageable elements, and two simple planetary gear sets. The following table indicates which friction elements are engaged to establish each of the forward driving ratios and reverse. In the table the symbol "D" means disengaged and the symbol "E" means engaged. The ratio values given are to be understood as typical of those obtained in a particular example of a transmission constructed in accordance with the present invention.

pounded planetary drive of carrier 154 will be provided in the forward direction, which will be a forward driving ratio of 2.518, for example.

When third forward driving ratio is established clutch 14 remains engaged, clutch 84 is disengaged and clutch 86 is engaged. With clutch 86 engaged, planetary carrier 96 is drivingly connected to input shaft 28 and sun gear 92, locking up planetary gear set 80 such that it rotates as a unit with the input shaft. Thus, ring gear 152 will be driven in a forward direction by input shaft 28, with sun gear 150 held stationary by brake 88 and ring gear 152 rotating with input shaft 28, planetary carrier 154 and output shaft 162 in a forward direction at a reduced driving ratio of 1.535, for example.

When fourth driving ratio is to be established clutch 14 remains engaged, clutch 86 remains engaged, brake 88 is released and clutch 84 is engaged. With clutch 84 engaged and planetary gear set 80 being locked up by clutch 86, a direct drive to planetary carrier 154 and output shaft 162 from input shaft 28 is provided, thus providing a one-to-one locked up driving ratio.

| RANGE | RATIO | CLUTCH 14 | CLUTCH 84 | CLUTCH 86 | BRAKE 88 | BRAKE 90 |
|---|---|---|---|---|---|---|
| NEUTRAL | — | D | D | D | D | D |
| FIRST | 4.356 | E | D | D | E | D |
| SECOND | 2.518 | E | E | D | E | D |
| THIRD | 1.535 | E | D | E | E | D |
| FOURTH | 1.00 | E | E | E | D | D |
| REVERSE | 5.274 | E | D | D | D | E |

In describing the operation of the transmission mechanism disclosed herein, it will be understood that when it is indicated one of the brakes or clutches is engaged, that fluid pressure is applied selectively to the fluid chamber for that friction device to actuate the piston therein to engage the friction elements, and when released fluid pressure is exhausted from the fluid chamber and the return springs return the piston to its original position releasing the friction elements. Thus, to simplify the ensuing description it will only be stated that the friction devices are engaged or released, and the manner of engagement of release will be understood by those of ordinary skill in the art to be as stated above.

Neutral is provided when none of the friction elements are engaged. When first ratio is to be established brake 88 is engaged and then clutch 14 is gradually engaged by suitable fluid controls so that such engagement is not harsh. Thus, the engine will drive through clutch 14 to input shaft 28. Input shaft 28 will drive sun gear 92 and since brake 88 is engaged inner race 228 and hub 226 are stationary and brake reaction member 176 and ring gear 94 will be held stationary by one-way device 220. Thus, planetary carrier 96 will rotate in a forward direction at a reduced ratio driving ring gear 152 of planetary set 82 since gun gear 150 is stationary, and carrier 154 and output shaft 162 are driven in a forward direction to establish first driving ratio which may for example, in accordance with the above table be a 4.356 ratio.

When second forward ratio is to be established clutch 14 remains engaged, brake 88 remained engaged, and clutch 84 is engaged. When clutch 84 is engaged ring gear 94 is connected directly to carrier 154 and thus output shaft 162. Thus, with sun gear 92 driving and ring gear 94 directly connected to output shaft 162 by clutch 84, and sun gear 150 held stationary, carrier member 96 being connected to ring gear 152, com- When reverse driving ratio is to be engaged clutch 14 is engaged and brake 90 is engaged. With sun gear 92 driven in the forward direction by input shaft 28, and planetary carrier 96 being held stationary by brake 90, ring gear 94 will be driven in the reverse direction by sun gear 92. With ring gear 94 driving in the reverse direction by means of one-way clutch 220 (since the outer race 224 is rotating in a reverse direction) a connection between ring gear 94 and hub 226 and sun gear 150 is established. Due to ring gear 94 driving sun gear 150 in the reverse direction, and the fact that ring gear 152 of planetary set 82 is held stationary by brake 90, the output carrier 154 will drive output shaft 162 in the reverse direction at a reduced ratio which may, for example, be a 5.274 ratio.

From the above it will be apparent that the transmission mechanism 10 in a unique and novel manner provides four forward driving ratios and reverse from an extremely compact transmission arrangement. As will be apparent from the above table of ratios, functionally desirable ratio steps are provided. Secondly, since second ratio is established by taking over from one-way clutch 220 when clutch 84 is engaged it will be apparent to those of ordinary skill in the art that the smoothness of the ratio change from first to second ratio is enhanced.

In addition to the unique advantages of the compactness of the transmission mechanism to provide four driving ratios it will be apparent to those ordinary skill in the art by having brake mechanisms 88 and 90 of identical diameter economy of manufacture is provided in that the same brake discs or plates may be used for both brakes 88 and 90. Secondly, both clutches 84 and 90, thus, resulting in economies in that the clutch plates to be utilized in clutches 84 and 86 may be manufactured from the internal portions of the sheet metal discs out of which the brake discs are manufactured. This economy extends not only to the steel plates themselves but to the manufacture of the friction facings elements of the brakes and clutches as well.

Further, starting of the vehicle or the shift to first ratio from neutral may be accomplished merely by bringing on or engaging brake 88. The brake 88 is of a large diameter thus insuring proper torque capacity and can include a large number of plates to provide for minimum wear.

Additional economies result from the present transmission mechanism since all major structural members within the gear set mechanism 16 may be constructed of sheet metal components and the splines for the various friction elements can be conveniently made by forming splines into sheet metal parts as described herein.

Further by establishing the ratios as set out above in the table an analysis of the speeds of various elements will indicate that throughout the range of forward operation none of the elements has an extremely high rotational speed as is normally found when an attempt is made to obtain as many as four forward driving ratios, from two simple planetary sets.

Referring to FIG. 2 an optional form of transmission mechanism is provided wherein the clutch 14 is replaced by a torque converter assembly 400. The converter assembly 400 would include a pump or impeller element 402 connected to shaft 26 to be driven by the engine and output turbine 404 is included which is connected on the inner diameter through splines to input shaft 28 to the transmission mechanism. The torque converter assembly 400 would also include a stator or reaction member 406 in the fluid circuit between impeller 402 and 404. The stator 406 engages a stationary hub 408 connected to a casing through a one-way device 410 as is well known in the prior art.

Operation of the transmission shown in FIG. 2 would be identical to that described above to establish the various driving ratios through the transmission. Of course, the turbine 404 of the hydraulic torque converter is always conditioned for imparting torque to the transmission since there is always a fluid hydrokinetic drive between the impeller and the turbine, when the engine is rotating input shaft 26. However, the neutral condition would be established by having none of the friction elements of the transmission engaged and thus even though the turbine could be turning no rotational driving effort is transferred to the output shaft 162. Further, as well known in the prior art when the transmission would be conditioned for first driving ratio by engagement by brake 88 with the input shaft 28 being turned by turbine 404 the vehicle can still not be moving if the vehicle brakes were applied, stalling and holding stationary turbine 404 with the engine et idle, this type of operation also being well known in the prior art.

As will be apparent when the use of the torque converter 400 is utilized with the transmission assembly 16 of the torque converter there is always at least a slight speed difference at higher vehicle speeds between impeller 402 and 404. Thus, the fuel economy is not as great since the torque converter does not completely lock up as would clutch 14. However, the sacrifice of economy is compensated for by the shock absorbing characteristics of the torque converter 400 as will be desirable when used with certain engines which may have a great amount of torsional vibration in which case the shock absorbing characteristic of the torque converter 400 becomes more important than the more efficient form of drive provided by clutch 14.

In addition to the above possibilities described with respect to transmission 16 it is also contemplated that the engine could be directly connected to input shaft 28 through a damper assembly and the clutch 14 and torque converter 400 both not included in the drive connection. In this form of operation the neutral is provided again by having none of the elements within the transmission mechanism 16 engaged and when first ratio is to be established brake 88 would be gradually engaged to gradually provide the forward driving ratio to the vehicle driving wheels. In such case when the vehicle is stopped, the brake 88 would be disengaged.

Although the transmission as shown herein is in the form of a center output type transmission it will be apparent to those of ordinary skill in the art, that the transmission may be easily reconstructed to make it an "in line" unit for normal front engine-rear drive vehicles. In such a case, as viewed in FIG. 1, the input clutch 14 or torque converter 400 would be connected to the right end of input shaft 28 adjacent to clutch 86, and output shaft 162 would extend from the other end of the transmission to connect with the drive line to the rear wheels.

In addition it will be apparent that although the present transmission is disclosed with friction disc type brakes 88 and 90, band type brakes could be substituted therefore if desired. The use of band brakes may be desirable in those environments wherein it is important to maintain a minimum dimension in the radial direction.

We claim:

1. A transmission mechanism for an engine driven vehicle having four forward ratios and reverse and including a pair of simple planetary gear sets; a single input shaft connected to said gear sets; an engageable input means adapted to connect said engine to said input shaft; said gear sets each having a sun gear element, a ring gear element, and a planetary carrier element having pinion gears meshing with said sun and ring gears; said input shaft being connected to a sun gear for one of said planetary sets; a first clutch means engageable to connect said input shaft to said planetary carrier for said one planetary set thereby locking up said one planetary gear set when engaged; a second clutch means engageable to connect the ring gear of said one gear set with the carrier element of said other gear set; a first brake means for the carrier element of said one gear set and the ring gear of said other gear set; a second brake means for the sun gear of said other gear set; an output shaft connected to said carrier element of said other gear set; and a one-way engaging device provided between said second brake means and said ring gear of said one gear set; whereby first ratio is obtained by engagement of said input means and said second brake means, second ratio is obtained by engagement of said input means, said second brake means and said second clutch means, and fourth ratio is obtained by engagement of said first and second clutch means.

2. A transmission mechanism as claimed in claim 1 wherein said output shaft has an output means thereon, said output means being located between said input means and said gear sets, and said output shaft being concentric with and having said input shaft extending therethrough.

* * * * *